United States Patent Office 2,745,833
Patented May 15, 1956

2,745,833
PRODUCTION OF SUBSTITUTED PYRIDINES

Charles E. Stoops and Charles E. Becker, Bartlesville, Okla., assignors to Phillips Petroleum Company, a corporation of Delaware No Drawing. Application May 29, 1950,
Serial No. 165,098

13 Claims. (Cl. 260—290)

This invention relates to a process for the production of substituted pyridines. In one aspect this invention relates to a process for the production of alkyl substituted pyridines by the catalytic condensation of aldehydes and ketones. In one specific embodiment this invention relates to a novel process for the production of 2-methyl-5-ethyl pyridine.

Pyridine homologs are useful as intermediate compounds in the production of pyridine derivatives containing unsaturated side chains, such as the vinyl pyridines which are capable of undergoing copolymerization with other unsaturated organic compounds, such as butadiene, to produce potentially useful synthetic rubbers. Vinyl pyridines can be prepared from pyridine homologs, such as 2-methyl-5-ethyl pyridine which is also known as aldehyde collidine and aldehydin, by various methods. For example, 2-methyl-5-ethyl pyridine may be reacted with formaldehyde to produce the monomethylol derivative which, upon dehydration, produces 2-vinyl-5-ethyl pyridine. Also, the ethyl group in 2-methyl-5-ethyl pyridine may be dehydrogenated to produce 2-methyl-5-vinyl pyridine.

The condensation of aldehydes and ketones, either saturated or unsaturated, and derivatives thereof with ammonia or its derivatives to form substituted pyridines is one of the oldest of organic reactions. See R. L. Frank et al., Journal of the American Chemical Society, 71, pages 2629 et seq. (August, 1949) and R. L. Frank et al., Journal of the American Chemical Society, 68, pages 1368–9 (July, 1946.) The condensation reactions have been effected non-catalytically, and ammonium acetate and alumina have been employed in the prior art as catalysts for the reaction. Also, ammonium chloride has been reported as showing the same effect as ammonium acetate. However, the prior art methods have a poor reputation for commercial production because of the formation of mixtures of pyridines and various by-products. In addition, when operating according to the prior art, relatively low yields of individual products have usually been reported.

It is an object of this invention to provide a novel process for the production of substituted pyridines.

It is another object of this invention to provide a process for the production of substituted pyridines that eliminates difficulties in the prior art processes.

It is another object of this invention to condense aldehydes and ketones and their derivatives with ammonia in the presence of novel catalysts for the reaction.

It is another object of this invention to provide a novel process for the production of 2-methyl-5-ethyl pyridine from low-boiling aldehydes and ammonia.

It is a further object of this invention to employ novel catalyst for the condensation of low-boiling aldehydes and ammonia to produce 2-methyl-5-ethyl pyridine.

It is a further object of this invention to provide novel synergists for the catalytic reaction of aldehydes and ketones and their derivatives with ammonia to produce substituted pyridine.

It is still another object of this invention to provide a novel process for the recovery of pyridine derivatives from the reaction mixture resulting from the catalytic reaction of low-boiling aldehydes and ammonia to produce 2-methyl-5-ethyl pyridine.

Further and additional objects of our invention will be apparent from the disclosure and description of our invention hereinbelow.

We have found that substituted pyridines can be produced by the improved method of reacting an organic aldehyde or ketone or derivative thereof with ammonia in the presence of alkali metal phosphate or alkaline earth metal phosphate glasses.

Throughout this disclosure we will refer to the aldehydes, ketones and derivatives thereof as carbonyl compounds. The carbonyl compounds within the scope of our invention are known in the art, and illustrative examples of these compounds are set forth in detail in the above-named references. To produce 2-methyl-5-ethyl pyridine we prefer to use an aldehyde containing no more than six carbon atoms per molecule, such as acetaldehyde, crotonaldehyde, and paraldehyde. However, our invention is not limited in scope to the production of this particular pyridine derivative nor to the use of the specific aldehydes. For example, aldehydes and ketones, i. e., benzalacetophenone, benzaldiacetophenone, ethylidene acetone, p-chlorobenzaldiacetophenone, and anisaldiacetophenone, may be condensed with ammonia to form pyridine derivatives. In addition, mixtures of aldehydes and ketones, for example benzaldehyde and acetophenone, benzaldiacetophenone and acetophenone, benzaldehyde and desoxybenzoin, benzalacetone and acetophenone, and benzalacetone and acetone, may be employed to form pyridine derivatives.

In one aspect of our invention we employ water soluble alkali or alkaline earth metal phosphate glasses as catalysts for the condensation, and the catalytic activity of the glasses is demonstrated by the data hereinbelow. Calcium phosphate glasses may be used, but we usually employ water soluble alkali metal phosphate glasses for the reaction, and we prefer to use a water soluble sodium phosphate glass. Descriptions of these glasses and the methods of producing them are contained in the articles by Partridge, Chemical and Engineering News 27, 214–217 (1949) and by Schwartz et al., Industrial and Engineering Chemistry 34, 32–40 (1942). The metal phosphate glasses, and particularly the sodium phosphate glasses, are readily prepared by heating the corresponding metal metaphosphate to a temperature above its melting point and rapidly cooling the resulting liquid to form a vitreous or glassy product. The glasses contain $P_2O_5$ and metallic oxides in varying amounts, and the ratio of $P_2O_5$ and metallic oxides extends over a wide range. More specifically, the glasses we employ can contain a minor, say 0.1 mol per cent, amount of metallic oxide, and the concentration of the metallic oxide may vary up to 60 mol per cent. The preferred glass for our process is available commercially, and it is known as sodium hexametaphosphate. This preferred glass contains equimolar proportions of $Na_2O$ and $P_2O_5$.

The water soluble metal phosphate glasses are introduced to the reaction mixture either in the form of a solid or in an aqueous solution, and, when we refer to phosphate glasses in our specification and claims, it will be understood that we are referring to phosphate glasses in the form of a solid or an aqueous solution. Since water is formed during the condensation reaction, it is sometimes desirable to introduce the glasses in solid form in order to limit the amount of water present in the reaction mixture. In operations where it is necessary to employ a large amount of the glasses in the reaction it may be desirable to introduce the glasses in an aqueous solution to facilitate the handling and transporting of the glasses.

In another aspect of our invention the metal phosphate glasses are employed as synergists for the condensation reaction. As synergists the glasses are employed with any suitable catalyst for the condensation reaction. Certain catalysts for the reaction have been discussed in the Frank et al. articles, and the metal phosphate glasses will improve the yield of condensation products when used with these catalysts. We prefer to employ the glasses as synergists with the fluorine-containing condensing agents set forth in the copending application of J. E. Mahan, Serial No. 135,291, filed December 27, 1949. These condensing agents are salts of fluorine-containing acids, and the preferred condensing agents are ammonium fluoride ($NH_4F$), ammonium bifluoride ($NH_4F \cdot HF$), boron trifluoride, preferably in a complex with ammonia or an amine, salts of fluoroboric acid, salts of the fluorophosphoric acids, salts of trifluoroacetic acid and salts of fluosilicic acid. The salts of the acids named above are usually the ammonium or metallic salts of the acids. The data hereinbelow show that, when these catalysts are used in the condensation reaction, increasing the amount of catalyst employed has little, if any, effect upon the yield of condensation product. However, when one of the metal phosphate glasses is used as a synergist in the reaction, the yield of condensation product is greater than the yields obtained when either glass or one of the above mentioned catalysts is used alone.

Water soluble metal phosphate glasses are novel catalysts and synergists for this process, and, although it is not essential to the course of the reaction, we have found it preferable to employ the catalysts in relatively small amounts. Usually from 0.05 to 10, preferably 0.1 to 6 weight per cent of the glasses based on the carbonyl compound is employed. When one of the catalysts discussed above is present in the reaction mixture, the total amount of catalyst and metal phosphate glass synergist is usually not above 10 weight per cent based on the carbonyl compound.

Mol ratios of ammonia to carbonyl compound undergoing condensation within the range of 1:1 to 12:1 are utilized, but higher ratios are operable in our process. We prefer to use mol ratios of ammonia to carbonyl compound within the range of 2:1 to 9:1 in order to maintain the volume of material to be handled at a low level.

The ammonia for the reaction is usually in an aqueous solution, but in some instances it may be desirable to conduct the reaction with anhydrous liquid ammonia. When an aqueous ammonia solution is utilized for the reaction, ammonia and water are supplied to the reaction in a ratio such that an ammonium hydroxide solution containing 10 to 90 weight per cent ammonium hydroxide is formed.

Optimum reaction temperatures are within the range of 300 to 650° F., preferably 450 to 550° F. The reaction is usually effected in the liquid phase, and, consequently, pressures at least sufficient to maintain the reaction mixture in liquid phase are employed. When operating with a closed pressure reactor, the autogenous pressures developed by the reaction mixture at the reaction temperature are satisfactory. These pressures are usually within the range of 850 to 2500 pounds per square inch gauge. The reaction period, or the time during which the reaction mixture is maintained at the desired reaction temperature, may vary from 5.0 minutes to 5.0 hours, preferably no longer than 2.0 hours. However, good yields of substituted pyridines can be obtained by cooling the reaction mixture, such as by quenching in ice water, as soon as the desired reaction temperature is attained. It is also desirable to cool the reaction mixture rapidly, such as by quenching in ice water, after the desired reaction period has expired. In this manner improved yields are obtained over procedures wherein the reaction mixture is allowed to cool slowly after expiration of the reaction period. Reaction periods longer than 2.0 hours may be used, but they are not essential to the process. Little, if any, advantage is gained by so operating, and, actually, the longer reaction periods may be conducive toward decomposition of the reaction products, resulting in decreased yields of the desired substituted pyridines. At the end of the desired reaction period, the temperature is lowered to about room temperature, and the substituted pyridines are recovered from the reaction mixture by any suitable method, such as fractional distillation.

In some instances it may be found desirable to employ an emulsifying agent in the reaction mixture. It is preferred that any emulsifying agent so employed by soluble in at least one of the components of the reaction mixture. Emulsifying agents that may be used include salts of saturated or unsaturated fatty acids containing at least six and not more than 18 carbon atoms, sulfates, such as lauryl sulfate, and sulfonates, such as alkaryl sulfonates. Non-ionic detergents, such as ethylene oxide condensation products of organic acids, alcohols, mercaptans, phenols, amides, and the like, as well as cationic surface active agents of the quaternary ammonium ion type may also be used.

Although we have described our invention as a batch process, the invention may also be practiced in a continuous operation, and such operation is within the scope of our invention. In one embodiment of a continuous process, reactants are introduced continuously to a suitable pressure reactor from which a portion of the reaction mixture is withdrawn continuously. Reaction products are separated therefrom, and unchanged reactants are then recycled to the reactor.

The examples hereinbelow are illustrative of our invention. In these experiments a stainless steel bomb was employed as the reactor. The bomb was provided with a thermometer well, and the bomb was wrapped with resistance wire and thus heated electrically. In conducting the experiments the bomb was charged with reactants, such as paraldehyde, aqueous or liquid ammonia and catalyst (when used) and firmly sealed. Air was removed from the bomb by adding nitrogen to a pressure of one hundred pounds per square inch and venting until the pressure was again atmospheric. A period of one hour to one and one-half hours was required for the bomb to attain the desired reaction temperature, and the duration of the run was the interval of time that the bomb was held at the desired reaction temperature. Agitation of the bomb was provided by an electrically driven platform rocker.

A series of runs was made to demonstrate the catalytic and synergistic effect of water soluble metal phosphate glasses and that increasing the amount of catalyst has little effect upon the yields of condensation product obtained. All runs were made under substantially the same conditions of temperature, pressure, mol ratio of reactants, and the like. Conditions of operation and yields of product are tabulated below.

| Run Number | 1 | 2 | 3 | 4 | 5 |
|---|---|---|---|---|---|
| Catalyst | None | Ammonium bifluoride | Ammonium bifluoride | Sodium hexametaphosphate | Ammonium bifluoride-sodium hexametaphosphate |
| Weight of catalyst, gms | | 13.6 | 2.0 | 2.0 | [1] 3.0 |
| Paraldehyde, gms | 170 | 170.0 | 170.0 | 170.0 | 170.0 |
| Paraldehyde, mols | 1.286 | 1.286 | 1.286 | 1.286 | 1.286 |
| Ammonia, gms | 173 | 173.0 | 173.0 | 173.0 | 173.0 |
| Ammonia, mols | 10.17 | 10.17 | 10.17 | 10.17 | 10.17 |
| Mol ratio, ammonia/paraldehyde | 7.91 | 7.91 | 7.91 | 7.91 | 7.91 |
| Water, gms | 211 | 211.0 | 211.0 | 211.0 | 211.0 |
| Gms. NH$_3$/100 gms. H$_2$O | 82.3 | 82.3 | 82.3 | 82.3 | 82.3 |
| Duration of run, hours | 3.0 | 0.5 | 0.5 | 0.5 | 0.5 |
| Temperature, °F | 490-500 | 490-500 | 490-500 | 490-500 | 490-500 |
| Per pass yield of 2-methyl-5-ethyl pyridine (mol percent of theoretical based on paraldehyde charged) | 59.0 | 75.2 | 75.9 | 66.3 | 81.2 |
| Per pass yield of picolines (mol percent of theoretical based on paraldehyde charged) | 4.52 | 2.26 | 3.01 | 5.66 | 2.18 |

[1] 2 grams of ammonium bifluoride and one gram of sodium hexametaphosphate.

A comparison of runs 1 and 4 shows the catalytic activity of the metal phosphate glass since the yields of condensation product obtained in run 4 are greater than those obtained in run 1. Also, a comparison of runs 3 and 4 shows that the metal phosphate glass has a lower catalytic activity than ammonium bifluoride. Consequently, it would be expected that a mixture of ammonium bifluoride and glass would produce a lower yield of product as compared with the ammonium bifluoride alone. However, run 5 shows that the mixture increased the yields of product.

In processes employed prior to our invention the pyridine derivatives were usually recovered from the reaction mixture by a steam distillation process. The reaction mixture, upon completion of the reaction, was acidified, and volatile non-basic compounds were removed by steam distillation. The non-volatile basic residue was made strongly basic to liberate organic bases, and the resulting mixture was steam distilled. The pyridine derivatives were then extracted from the resulting distillate. In our process, as a result of increased yields of pyridine derivatives when one of our glasses is used in the reaction mixture and the attendant decrease in side reactions, we have found it possible to recover the pyridine derivatives from the reaction mixture by extraction with a suitable solvent. This represents a considerable improvement over prior art processes, and it is useful in the commercial operation of our process. The solvents in our process dissolve the pyridine derivatives but they are immiscible with water. Liquid hydrocarbons are suitable in our process. Aliphatic hydrocarbons may be used, but we prefer to use aromatic hydrocarbons, for example, benzene and toluene. Also, halogenated hydrocarbon derivatives that are liquid at room temperatures, for example, chloroform, are also suitable for use in our process. After extraction of the pyridine derivatives from the reaction mixture with a solvent, such as benzene, the pyridine derivatives are readily separated from the solvent by a process such as fractional distillation and the like.

From the above disclosure numerous modifications of our process will be apparent to those skilled in the art.

We claim:

1. The process for producing pyridine derivatives which comprises reacting with ammonia a low-boiling aldehyde reactive with ammonia to produce pyridine derivatives in the presence of a salt of a fluorine-containing acid as a catalyst for the reaction and in the presence of an alkali metal phosphate glass.

2. A process according to claim 1 wherein the salt of a fluorine-containing acid is ammonium bifluoride.

3. A process according to claim 1 wherein the alkali metal phosphate glass is a sodium phosphate glass.

4. The process for preparing 2-methyl-5-ethyl pyridine which comprises contacting paraldehyde with ammonia in the presence of ammonium bifluoride and an alkali metal phosphate glass at a temperature within the range of 300 to 650° F. and at a pressure sufficient to maintain the reaction mixture in liquid phase.

5. The process for preparing 2-methyl-5-ethyl pyridine which comprises contacting paraldehyde with ammonia in the presence of ammonium bifluoride and sodium hexametaphosphate at a temperature within the range of 300 to 650° F. and at a pressure sufficient to maintain the reaction mixture in liquid phase.

6. A process according to claim 5 wherein the pressure is within the range of 850 to 2500 pounds per square inch gauge.

7. A process according to claim 5 wherein the reaction period is within the range of 5 minutes to 5 hours.

8. A process according to claim 5 wherein from 0.05 to 10 weight per cent of sodium hexametaphosphate based on paraldehyde is employed.

9. A process according to claim 5 wherein the ammonia and paraldehyde are employed in a molar ratio within the range of 1:1 to 12:1.

10. A process according to claim 5 wherein sufficient water is present in the reaction mixture to produce a solution with the reactant ammonia containing 10 to 90 weight per cent ammonium hydroxide.

11. The process for preparing 2-methyl-5-ethyl pyridine which comprises contacting paraldehyde with ammonia in the presence of ammonium bifluoride and sodium hexametaphosphate at a temperature within the range of 300 to 650° F. at a pressure sufficient to maintain the reaction mixture in liquid phase, and separating 2-methyl-5-ethyl pyridine from the resulting reaction mixture by contacting said mixture with a water immiscible organic solvent for said pyridine.

12. A process according to claim 11 wherein said organic solvent is benzene.

13. The process for producing pyridine derivatives which comprises reacting with ammonia a carbonyl compound selected from the group consisting of aldehydes and ketones reactive with ammonia to produce pyridine derivatives in the presence of a salt of a fluorine-containing acid as a catalyst for the reaction and in the presence of an alkali metal phosphate glass produced by heating the corresponding alkali metal phosphate to a temperature above its melting point and then rapidly cooling the same.

References Cited in the file of this patent

UNITED STATES PATENTS

| 1,636,701 | Meingast | July 26, 1927 |
| 2,520,097 | Hearne | Aug. 22, 1950 |
| 2,523,580 | Mahan | Sept. 26, 1950 |

FOREIGN PATENTS

| 230,063 | Great Britain | 1925 |
| 349,184 | Germany | 1922 |
| 394,689 | Great Britain | 1933 |
| 521,891 | France | 1921 |

OTHER REFERENCES

Frank: J. Am. Chem. Soc., July 1946, pp. 1368-69.